United States Patent [19]

Hille et al.

[11] Patent Number: 5,510,436

[45] Date of Patent: Apr. 23, 1996

[54] WATER-SOLUBLE COPOLYMERS USEFUL IN DRILLING FLUIDS

[75] Inventors: Martin Hille, Liederbach; Heinz Wittkus, Frankfurt am Main; Jürgen Tonhauser, Oestrich-Winkel; Fritz Engelhardt; Ulrich Riegel, both of Frankfurt am Main, all of Germany

[73] Assignee: Hoechst Aktiengesellschaft, Germany

[21] Appl. No.: 260,037

[22] Filed: Jun. 15, 1994

Related U.S. Application Data

[63] Continuation of Ser. No. 785,448, Oct. 31, 1991, abandoned.

[30] Foreign Application Priority Data

Oct. 31, 1990 [DE] Germany .................. 40 34 642.0

[51] Int. Cl.$^6$ .................................................. C08F 228/02
[52] U.S. Cl. .................. 526/240; 524/3; 526/264; 526/287; 507/118
[58] Field of Search .................... 526/240, 264, 526/287

[56] References Cited

U.S. PATENT DOCUMENTS

| | | | |
|---|---|---|---|
| 3,629,101 | 12/1971 | Hille et al. | |
| 3,994,852 | 11/1976 | Adams et al. | |
| 4,015,991 | 4/1977 | Persinski et al. | |
| 4,048,077 | 9/1977 | Engelhardt et al. | |
| 4,176,107 | 11/1979 | Buckman | 524/376 |
| 4,287,172 | 9/1981 | Jacquet | 526/264 |
| 4,309,523 | 1/1982 | Engelhardt et al. | 526/240 |
| 4,536,292 | 8/1985 | Matz | 210/701 |
| 4,587,283 | 5/1986 | Hille | 526/287 |
| 4,608,425 | 8/1986 | Peiffer | 526/240 |

FOREIGN PATENT DOCUMENTS

| | | |
|---|---|---|
| 0116671 | 1/1986 | European Pat. Off. |
| 0192447 | 6/1991 | European Pat. Off. |

*Primary Examiner*—Christopher Henderson
*Attorney, Agent, or Firm*—Connolly & Hutz

[57] ABSTRACT

The water-soluble copolymer comprises 5–90% by weight of groups of the formula

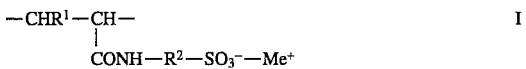

in which $R^1$ is hydrogen or methyl, $R^2$ is $C_2$–$C_{10}$-alkylene, and Me is ammonium or an alkali metal, 5–90% by weight of groups of the formula

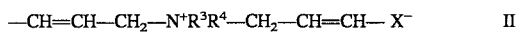

in which X is a halogen, $R^3$ and $R^4$, independently of one another, are $C_1$–$C_6$-alkyl, 0–60% by weight of groups of the formula

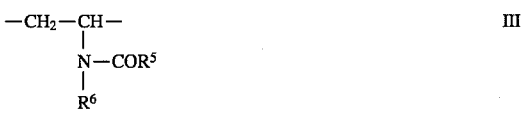

in which $R^5$ and $R^6$ together are a propylene group which with inclusion of the radical

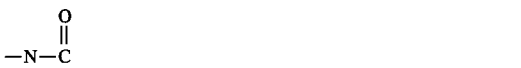

forms a pyrrolidone radical, and 0–30% by weight of groups of the formula

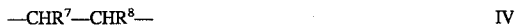

in which $R^7$ is hydrogen or methyl and $R^8$ is $CONH_2$, $CON(CH_3)_2$, cyano, $SO_3H$, $SO_3Me$, $C_6H_4SO_3H$, $C_6H_4SO_3Me$, $CH_2SO_3H$, $CH_2SO_3Me$, COOH, COOMe, or carboxy-$C_1$–$C_{15}$-alkyl, and Me is an ammonium cation or an alkali metal cation, and the order of components I to IV can be as desired.

The copolymer is used as water-binding additive for suspensions of solids, preferably for cement slurries, gypsum slurries, mortars, drilling muds or pigment suspensions, or as water-binding additive for aqueous salt solutions.

22 Claims, No Drawings

WATER-SOLUBLE COPOLYMERS USEFUL IN DRILLING FLUIDS

This application is a continuation, of application Ser. No. 07/785,448 filed Oct. 31, 1991 which is now abandoned.

The present invention relates to water-soluble copolymers, suspensions of solids and aqueous solutions containing these copolymers, to processes for their preparation and to their use.

BACKGROUND OF THE INVENTION

In deep drillings for developing oil or natural gas deposits, the use of drilling muds and cement slurries has been known for a long time. The purpose of drilling muds is to deliver the rock fragments obtained by drilling and the so-called drilling fines to the surface, lubricate the bit and the drill string, to seal porous rock layers and to compensate the deposit pressure by means of hydrostatic pressure. For the last-mentioned reason, drilling muds must have increased specific weight. This is achieved by adding, preferably, heavy spar, salts or clay. Further important features of drilling muds are temperature resistance and suitable flow properties which are only little affected by changes in the electrolyte concentration. The most widespread additives for controlling viscosity and loss of water of drilling muds are polymers, such as starch, carboxymethylcellulose and carboxymethylhydroxyethylcellulose. Since the 1950s, copolymers of the acrylamide/acrylate type have been used predominantly in salt-free drilling mud systems. During the 1970s, salt-stable copolymers with monomers (U.S. Pat. Nos. 3,629,101, 4,048,077, 4,309,523) containing sulfo groups and being stable up to more than 200° C. were developed.

Furthermore, cement slurries and completion fluids are used as drilling fluids in deep drillings for oil or natural gas. After they have reached a certain depth, iron pipes, so-called casings, are introduced into the borehole, through the cavity of which the bit is passed for drilling of the next lower rock layers. To this end, the casings have to be fixed, i.e. a cement slurry has to be pumped into the cavity between the rock and the outer walls of the casings, the so-called annular space, which slurry hardens to give solid stone. The resulting cement stone has to be impermeable to gases and liquids, so that no gas and/or oil can flow from the reservoir formation into other formations or to the surface. Very high demands are made on the cement slurry to be pumped. It should be readily pumpable, i.e. have the lowest possible viscosity, but nevertheless show no separation. The water release of the cement slurry to the porous rock should be low so as to prevent formation of thick filtercakes on the wall of the borehole, which would increase the pumping pressure as a result of the narrowing in annular space to such an extent that the porous rock forms cracks. Moreover, in the case of excessive water release, the cement slurry would not completely set and would become permeable to gas and oil. On the other hand, the resulting cement jacket in the annular space must quickly reach certain strengths, and during setting no shrinkage must occur leading to flow channels for gas, oil and water. Optimum adjustment of the properties of the cement slurry is only possible by means of additives.

The most important additives for controlling setting are retardants, accelerators, dispersants for liquefaction and agents for reducing water loss. Some of these additives have more than one function. Dispersants such as lignosulfonates and polymethylenenapthalenesulfonates retard setting and reduce water loss to some extent. Some agents for reducing water loss retard setting and drastically increase viscosity.

Effective agents for reducing water loss from cement and gypsum slurries used in practice comprise a wide range of polymers, copolymers and combinations thereof. The first effective products, which are still used today, are hydroxyethyl- and carboxymethylhydroxyethylcellulose. Hydroxyethylcellulose increases viscosity and somewhat retards setting. Carboxymethylhydroxyethylcellulose has a stronger retarding effect, which, however, can be compensated by accelerators. With increasing temperature, the effect of the cellulose ethers drops substantially. In subsequent years, many different fully synthetic polymers of higher temperature stability have been proposed and are in use. U.S. Pat. No. 3,994,852 describes polyvinylpyrrolidone/polyacrylamide copolymers, U.S. Pat. No. 4,015,991 describes hydrolysed acrylamide/2-acrylamido 2-methylpropanesulfonate copolymers, EP 0,192,447 describes dimethylacrylamide/2-acrylamido-2-methylpropanesulfonate copolymers and EP 0,116,671 describes 2-acrylamido-2-methylpropanesulfonate, acrylamide (partially hydrolysed) and vinylamide terpolymers, which are used in cement slurries for controlling water loss.

It is necessary to adjust the cement slurry in each case using the cement available at the derrick and the additives in accordance with requirements.

The large number of compounds developed makes it clear that it is always difficult to formulate an optimum cement slurry. In the case where the individual parameters are predetermined by the type of cementation, the necessary properties have to be set to acceptable values using additives. The high number of compounds developed for reducing water loss shows how problematical it is in most cases to set the water release to the required value without significantly increasing viscosity, to set the setting time to the required value and to minimize sedimentation. The previously known polymers reducing water loss strongly increase the viscosity of the cement slurries, which in most cases have high density, to greater or lesser degrees. However, for ready pumpability of the cement slurries, viscosity must be kept low. The pumping rate should be such that a turbulent flow is possible. Only under these conditions does complete displacement of the drilling mud take place. This is a prerequisite of good cementation. In the case of inclined drillings, the mud can only be readily displaced by a strong turbulent flow.

For completing oil and natural gas wells, salt solutions of high density are used, which compensate the deposit pressure. During this, their infiltration of the deposit must be kept to a minimum. However, hydroxyethylcelluloses are not suitable for the temperatures of more than 200° C. occurring there and the high salinities and densities brought about by $CaCl_2$ and $CaBr_2$.

SUMMARY OF THE INVENTION

The object of the present invention is to develop drilling fluids, such as cement slurries, drilling muds and completion fluids which upon contact with porous layers release a minimum amount of water to the formation and have low viscosity, thus ensuring ready pumpability.

This object is achieved by water-soluble copolymers comprising 5 to 90% by weight of groups of the formula

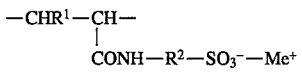  I $$-CHR^1-CH-$$
$$\phantom{XXX}|$$
$$\phantom{XX}CONH-R^2-SO_3^--Me^+$$

in which $R^1$ is hydrogen or methyl, $R^2$ is $C_2$-$C_{10}$-alkylene, preferably $C_2$-$C_6$-alkylene, in particular $C_4$-alkylene, i.e. n-, iso- or tert-butyl and Me is ammonium or an alkali metal, 5–90% by weight of groups of the formula

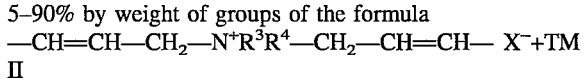  II $$-CH=CH-CH_2-N^+R^3R^4-CH_2-CH=CH- \; X^-+TM$$

in which X is a halogen, preferably chloride, $R^3$ and $R^4$, independently of one another, are $C_1$-$C_6$-alkyl, preferably $C_1$-$C_3$-alkyl, in particular methyl or ethyl, 0–60% by weight of groups of the formula

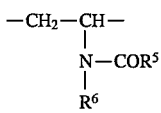  III $$-CH_2-CH-$$
$$\phantom{XX}|$$
$$\phantom{XX}N-COR^5$$
$$\phantom{XX}|$$
$$\phantom{XX}R^6$$

in which $R^5$ and $R^6$, independently of one another, are hydrogen, methyl or ethyl or $R^5$ and $R^6$ together are a propylene group which with inclusion of the radical

$$\phantom{X}O$$
$$\phantom{X}\|$$
$$-N-C-$$

forms a pyrrolidone radical, and 0–30% by weight of groups of the formula

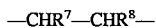  IV $$-CHR^7-CHR^8-$$

in which $R^7$ is hydrogen or methyl and $R^8$ is $CONH_2$, $CON(CH_3)_2$, cyano, $SO_3H$, $SO_3Me$, $C_6H_4SO_3H$, $C_6H_4SO_3Me$, $CH_2SO_3H$, $CH_2SO_3Me$, COOH, COOMe, or an ester group COOR, in which R is $C_1$-$C_{15}$-alkyl, preferably $C_1$-$C_8$-alkyl, and Me is an ammonium cation or an alkali metal cation, and the order of components I to IV can be as desired.

DESCRIPTION OF THE PREFERRED EMBODIMENTS

The object of the present invention is to develop drilling fluids, such as cement slurries, drilling muds and completion fluids which upon contact with porous layers release a minimum amount of water to the formation and have low viscosity, thus ensuring ready pumpability.

This object is achieved by water-soluble copolymers comprising 5 to 90% by weight of groups of the formula

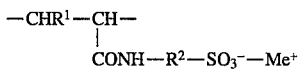  I $$-CHR^1-CH-$$
$$\phantom{XXX}|$$
$$\phantom{XX}CONH-R^2-SO_3^--Me^+$$

in which $R^1$ is hydrogen or methyl, $R^2$ is $C_2$-$C_{10}$-alkylene, preferably $C_2$-$C_6$-alkylene, in particular $C_4$-alkylene, i.e. n-, iso- or tert-butyl and Me is ammonium or an alkali metal, 5–90% by weight of groups of the formula

  II $$-CH=CH-CH_2-N^+R^3R^4-CH_2-CH=CH- \; X^-$$

in which X is a halogen, preferably chloride, $R^3$ and $R^4$, independently of one another, are $C_1$-$C_6$-alkyl, preferably $C_1$-$C_3$-alkyl, in particular methyl or ethyl, 0–60% by weight of groups of the formula

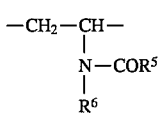  III $$-CH_2-CH-$$
$$\phantom{XX}|$$
$$\phantom{XX}N-COR^5$$
$$\phantom{XX}|$$
$$\phantom{XX}R^6$$

in which $R^5$ and $R^6$, independently of one another, are hydrogen, methyl or ethyl or $R^5$ and $R^6$ together are a propylene group which with inclusion of the radical

$$\phantom{X}O$$
$$\phantom{X}\|$$
$$-N-C-$$

forms a pyrrolidone radical, and 0–30% by weight of groups of the formula

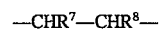  IV $$-CHR^7-CHR^8-$$

in which $R^7$ is hydrogen or methyl and $R^8$ is $CONH_2$, $CON(CH_3)_2$, cyano, $SO_3H$, $SO_3Me$, $C_6H_4SO_3H$, $C_6H_4SO_3Me$, $CH_2SO_3H$, $CH_2SO_3Me$, COOH, COOMe, or an ester group COOR, in which R is $C_1$-$C_{15}$-alkyl, preferably $C_1$-$C_8$-alkyl, and Me is an ammonium cation or an alkali metal cation, and the order of components I to IV can be as desired.

For practical application, it is particularly advantageous if the copolymer contains a group of the formula III, in which the radicals $R^5$, $R^6$ and the group NCO form the pyrrolidone radical

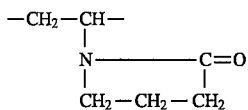

$$-CH_2-CH-$$
$$\phantom{XX}|$$
$$\phantom{XX}N\!-\!-\!-\!-\!-\!C=O$$
$$\phantom{XX}|\phantom{XXXXX}|$$
$$\phantom{XX}CH_2-CH_2-CH_2$$

The copolymers described are used in suspensions of solids, for example in cement slurries, gypsum slurries as well as mortars, drilling muds and in an analogous manner in pigment suspensions and in aqueous, including saline, solutions as water binders. In these systems, water release to porous layers can be substantially reduced by adding the copolymers according to the invention.

Accordingly, the object mentioned is furthermore achieved by means of the suspension of solids according to claim 2, the aqueous solution according to claim 5 and the uses mentioned in claims 8 and 9.

In aqueous suspensions of solids, copolymers comprising 40 to 80% by weight of groups of the formula I, 10–50% by weight of the formula II and 5–30% by weight of groups of the formula III are preferred. They are added to the suspension in concentrations of 0.1–4% by weight, it being possible for the suspensions of solids to contain 2–75% by weight of solid.

In aqueous solutions, copolymers comprising 40–90% by weight of groups of the formula I and 10–60% by weight of groups of the formula II are preferred. The copolymers are added to the aqueous solutions in concentrations of 0.2–8% by weight. The aqueous solutions preferably contain $CaCl_2$ and/or $CaBr_2$, which makes their density greater than 1 g/cm³, preferably 1.4–1.81 g/cm³.

Copolymers comprising the monomers 2-acrylamido-2-methylpropanesulfonates (AMPS), diallyldimethylammonium chloride (DADMAC), N-vinyl-N-methylacetamide (ViMA) and acrylamide and acrylates (AM) have proven to be particularly suitable.

The molecular weights of the copolymers according to the invention are 50,000–3,000,000, preferably 200,000–1,000,000, and are characterized in the exemplary embodiments by their viscosity, given in K values according to Fikentscher (Cellulosechemie, 13, (1932), 58).

The ampholytic copolymers according to the invention stabilize the water loss and flow properties of drilling muds up to more than 200° C. even in the presence of divalent ions. By varying the monomer proportions in the copolymer, it is possible to influence very selectively the flow properties of the drilling muds. The anionic groups have a deflocculating effect and the cationic ones a crosslinking effect on the clay particles, which increases thixotropy.

The object on which the invention is based is furthermore achieved by preparing the monomers of the formulae I to IV by a process of solution polymerization, bulk polymerization, emulsion polymerization, inverse emulsion polymerization, precipitation polymerization or gel polymerization.

The polymerization is preferably carried out as solution polymerization in water or as precipitation polymerization.

When the copolymerization is carried out in a water-miscible organic solvent, the conditions are those of precipitation polymerization. This gives the polymer directly in solid form and makes it possible to isolate it by distilling off the solvent or filtering it off with suction and drying it.

Water-miscible organic solvents which are suitable for carrying out the preparation process according to the invention are in particular water-soluble alkanols, i.e. those having 1 to 4 carbon atoms, such as methanol, ethanol, propanol, isopropanol, n-, sec- and iso-butanol, but preferably tert-butanol.

The water content of the lower alkanols used in this reaction as solvent should not exceed 6% by weight, since otherwise the product may agglomerate during polymerization. Preferably, the water content of the alcohol used is 0–3% by weight.

The amount of the solvent to be used depends to a certain extent on the type of the comonomers used. As a rule, 200 to 1,000 g of the solvent are used per 100 g of total monomers.

When the polymerization is carried out in inverse emulsion, the aqueous monomer solution is emulsified in a known manner in an organic solvent which is not miscible with water, such as cyclohexane, toluene, xylene, heptane or high-boiling benzine fractions, with addition of 0.5 to 8% by weight, preferably 1 to 4% by weight, of known emulsifiers of the water-in-oil type and polymerized using conventional free radical forming initiators.

The principle of inverse emulsion polymerization is disclosed in U.S. Pat. No. 3,284,393. In this process, water-soluble monomers or mixtures thereof are polymerized in the heat to give high-molecular-weight copolymers by first emulsifying the monomers or aqueous solutions thereof with the addition of water-in-oil emulsifiers in a solvent which is not miscible with water and forms the continuous phase and this emulsion is heated in the presence of free radical initiators. The comonomers to be used can be emulsified as such in the organic solvent which is not miscible with water or they can be used in the form of an aqueous solution containing between 100 and 5% by weight of comonomers and 0 to 95% by weight of water, the composition of the aqueous solution being a matter of the solubility of the comonomers in water and the intended polymerization temperature. The ratio between water and the monomer phase is variable within wide limits and is usually 70:30 to 30:70.

In order to emulsify the monomer phase in the organic solvent which is not miscible with water to give a water-in-oil emulsion, 0.1 to 10% by weight, relative to the oil phase, of a water-in-oil emulsifier is added to the mixtures. Preferably, those emulsifiers are used which have a relatively low HLB value. The HLB value is a measure of hydrophobicity and hydrophilicity of surfactants and emulsifiers (Griffin, J. Soc. Cosmetic Chemists 1, (1950), 311). Substances having a low HLB value, say below 10, are in general good water-in-oil emulsifiers.

Any inert water-insoluble liquid, i.e. any hydrophobic organic solvent, can in principle be used as the oil phase. In general, in the context of the present invention, hydrocarbons whose boiling point is in the range from 120° to 350° C. are used. These hydrocarbons can be saturated, linear or branched paraffinic hydrocarbons, such as are predominantly present in petroleum fractions, it being possible for these hydrocarbons also to contain the customary proportions of naphthenic hydrocarbons. However, it is also possible to use aromatic hydrocarbons such as, for example, toluene or xylene and the mixtures of the abovementioned hydrocarbons as the oil phase. Preferably, a mixture of saturated normal and isomeric paraffinic hydrocarbons containing up to 20% by weight of naphthenes is used. A detailed description of the process can be found, for example, in German Patent No. 1,089,173 and in U.S. Pat. Nos. 3,284,393 and 3,624,019.

Copolymers having molecular weights of more than 1,000,000 are obtained by carrying out the polymerization in aqueous solution by the process of so-called gel polymerization. In this reaction, 15 to 60% by weight solutions of the comonomers are polymerized using known suitable catalysts without mechanical mixing, taking advantage of the Trommsdorff-Norrisch effect (Bios Final Rep. 363, 22; Macromol. Chem. 1, 169/1947).

The copolymers according to the invention prepared in this manner and present in the form of aqueous jellies can, after mechanical comminution using suitable apparatuses, be dissolved directly in water and be used. However, they can also, after water has been removed, be obtained in solid form by means of known drying processes and only redissolved in water when they are used.

The polymerization reactions are carried out in the temperature range between −60° C. and 200° C., preferably between 10° and 120° C., it being possible to work either under atmospheric pressure or under elevated pressure. As a rule, the polymerization is carried out in an inert gas atmosphere, preferably under nitrogen. The polymerization can be initiated by using high-energy electromagnetic or particle radiation or conventional chemical polymerization initiators, for example organic peroxides such as benzoyl peroxide, tert-butyl hydroperoxide, methyl ethyl ketone peroxide, cumene hydroperoxide, azo compounds such as azobisisobutyronitrile or 2,2'-azobis(2-amidinopropane) dihydrochloride and inorganic peroxy compounds such as $(NH_4)_2S_2O_8$ or $K_2S_2O_8$ or $H_2O_2$, if appropriate in combination with reducing agents such as sodium bisulfite and iron(II) sulfate or redox systems containing an aliphatic or aromatic sulfinic acid, such as benzenesulfinic acid and toluenesulfinic acid or derivatives of these acids, such as, for example, Mannich adducts of sulfinic acid with aldehydes and amino compounds, as described in German Patent No. 1,301,566, as the reducing component. As a rule, 0.03 to 2 g of the polymerization initiator are used per 100 g of total monomers.

If desired, small amounts of so-called moderators can be added to the polymerization batches; they harmonise the course of the reaction by flattening the reaction rate/time diagram. They thus lead to an improvement in reproducibility of the reaction and thus make it possible to prepare uniform products having a narrow molecular weight distribution and a high chain length. Examples of suitable moderators of this type are nitrilotrispropionylamide or monoalkylamines, dialkylamines or trialkylamines, such as, for example, dibutylamine. These moderators can advantageously also be used when preparing the copolymers according to the invention. Furthermore, so-called regulators, which adjust the molecular weight of the prepared polymers by a selective chain termination, can be added to the polymerization batches. Examples of useful known regulators are alcohols, such as methanol, ethanol, propanol, isopropanol, n-butanol, sec-butanol and amyl alcohols, alkanethiols, such as, for example, dodecanethiol and tert-dodecanethiol, isooctyl thioglycolate and some halogen compounds, such as, for example, carbon tetrachloride, chloroform and methylene chloride.

The preparation of the copolymers is illustrated by Examples 1 to 5.

EXAMPLE 1

468.00 g of tert-butanol (600 ml) are initially introduced into a 1 l polymerization flask equipped with stirrer, thermometer, reflux condenser, gas introduction tube and electrically heated water bath, and 65.00 g of 2-acrylamido-2-methylpropanesulfonate (AMPS) are suspended therein.

About 5.4 g of ammonia gas are introduced via a gas introduction tube, leading to a slightly cloudy solution. The pH of this solution has to be greater than 7, otherwise more ammonia has to be introduced.

20.00 g of N-vinyl-N-methylacetamide (ViMA) and 25.00 g of diallyldimethylammonium chloride (DADMAC) are then added in the form of a 60% by weight aqueous solution, and the solution is heated to a temperature of 50°–55° C. while introducing a gentle stream of nitrogen. After reaching this temperature, 1.00 g of azobisisobutyronitrile is added, and the stirring rate is lowered to about 60 rpm. Polymerization starts after a few minutes, which can be detected by flocculation of the polymer and a slight increase in temperature. In the course of about 45 minutes, a thick paste which is only just stirrable is formed, and the temperature increases to about 75°–80° C. After reaching the temperature maximum, stirring at 80° C. is continued for 2 hours, the polymer is then filtered off with suction and dried at 60° C. in a vacuum drying cabinet to constant weight. This gives 105 g of a white powder having a bulk density of about 0.3 kg/l and a K value according to Fikentscher of 162.

EXAMPLE 2

800.00 g of drinking water, 120.00 g of AMPS 50.00 g of diallyldimethylammonium chloride, 60% by weight aqueous solution, are initially introduced in succession into a 2 l polymerization flask equipped with stirrer, thermometer, reflux condenser and gas introduction tube, and the mixture is brought to a pH of greater than 7 by adding 85.00 g of NaOH, 27% by weight solution. After adding 50.00 g of N-vinyl-N-methylacetamide, the solution is heated to 40°–45° C. while introducing a gentle $N_2$ stream.

0.50 g of 2,2'-azobis(2-amidinopropane) dihydrochloride is added, 5–10 minutes after which polymerization starts, which can be detected by an increase in viscosity and temperature. After reaching the temperature maximum, the mixture is heated to 80° C. and stirred under these conditions for another 2 hours. To ensure better handling of the polymer solution when cooled, 700.00 g of drinking water are added, and the mixture is stirred with cooling to 20° C. until it is homogeneous. This gives a slightly cloudy, slightly yellowish solution having a solids content of 11.5% by weight and a K value according to Fikentscher of 195.

EXAMPLE 3

240.00 g of perchloroethylene and 140.00 g of ®Shellsol 100/140 (hydrocarbon mixture having a boiling range of 100°–140° C., Shell) are initially introduced into a 0.7 l polymerization flask equipped with U-shaped stirrer contacting the walls, thermometer, reflux condenser and gas introduction tube, and 3.00 g of protective colloid (copolymer of a polypentadiene oil with maleic anhydride) are dissolved therein. The monomer solution is added dropwise at 20°–25° C. together with the initiator over a period of 10 minutes. The monomer solution is prepared as follows:

67.00 g of diallyldimethylammonium chloride (60% by weight aqueous solution) and 20.00 g of water are initially introduced and 60.00 g of AMPS are dissolved therein. The solution is brought to a pH of 7.5–8.5 by adding 21.00 g of 25% by weight aqueous ammonia solution with ice cooling.

10.00 g of a 10% by weight aqueous ammonium persulfate solution are then added. While introducing a gentle $N_2$ stream, the reaction solution is heated to an internal temperature of 80° C. by means of an electrically heated oil bath over a period of 50 minutes at a stirring rate of 180–200 rpm. Polymerization takes place over a period of 75–80 minutes, after which stirring is continued for another 60 minutes. The reflux condenser is then exchanged for a water separator, and 65 g of water are distilled off azeotropically over a period of 90–95 minutes by rapid heating to 140° C. The beads formed are filtered off through a sintered glass crucible G1, washed once with 100 ml of acetone and dried at 50° C./0.26 bar. This gives 101.5 g of product having a K value according to Fikentscher of 154.

EXAMPLE 4

179.50 g of ®Isopar M (mixture of branched $C_8$–$C_{14}$-paraffins, Esso) are initially introduced into a 1 l polymerization flask equipped with stirrer, thermometer, reflux condenser and gas introduction tube, and 13.30 g of nonylphenol ethylene oxide adduct (®Arkopal N 100 from Hoechst AG) and 35.30 g of sorbitan monooleate (®Span 80 from Atlas Chemie GmbH) are dissolved therein. The monomer solution is prepared separately:

135.00 g of water are initially introduced, 64.00 g of AMPS are dissolved therein, and the pH is brought to 7.5–8.5 by introducing $NH_3$ gas with ice cooling.

139.50 g of diallyldimethylammonium chloride, 60% by weight aqueous solution, 10.00 g of N-vinyl-N-methylacetamide and 10.00 g of methyl methacrylate are then added. The monomer solution is then admixed to the oil phase over a period of 5 minutes with stirring. The reaction solution is emulsified for 3 minutes using an Ultraturrax with ice cooling.

2.0 ml of a 1% by weight cumene hydroperoxide solution in ethyl acetate are added and the polymerization flask is then evacuated 3 times to less than 4 mbar, each time aerated with $N_2$, which is then continuously passed in. The monomer emulsion is cooled to 5° C., the stirring rate remains constant from now on at 180 rpm.

100 ppm of thionyl chloride are then added, after which polymerization starts shortly, which can be detected by the increase in temperature. The reaction temperature is maintained at 18°–20° C. by cooling. When an exothermic reaction is no longer detectable, the mixture is heated to 50° C. and 10.00 g of a 1% by weight aqueous ammonium persulfate solution are metered in over a period of 60 minutes, and stirring at 50° C. is then continued for another 5 hours. After cooling to 20° C., 27.50 g of ®Arkopal N 100 are stirred in for better inversion in use. This gives a micro-emulsion having a K value according to Fikentscher, in the inverted state, of 165.

EXAMPLE 5

A monomer solution is prepared as follows:

10.00 g of AMPS are dissolved in 350.00 g of water and the mixture is brought to a pH of 7.5–8.5 by adding about 2.00 g of aqueous ammonia solution.

40.00 g of acrylamide, 25.00 g of diallydimethylammonium chloride, 60% by weight aqueous solution, and 120.00 g of vinylpyrrolidone (VINPYR) are added in succession. After the mixture is brought to 20°–23° C., 10.00 g of 1% by weight aqueous ammonium persulfate solution are additionally stirred in, and the entire solution is then transferred to a plastic bottle well insulated by Styropor. A gentle $N_2$ stream is introduced. After about 2 hours, polymerization starts, during which in the course of approximately another 2 hours the temperature increases to 90° C. The polymer gel obtained is then comminuted mechanically, dried, ground and screened to the desired particle size. This gives a product having a K value according to Fikentscher of 171.

Table 1 lists the K values of further copolymers synthesized according to Preparation Example 1 or 2.

All percentages given are by weight.

1. Deep-drilling cements

The tests were carried out in accordance with API spec. 10. The cement slurry is stirred at 93° C. (200° F.) for one hour in an atmospheric Chandler consistometer, and the rheological properties are then measured at the same temperature using the Fann viscometer model 35SA and the water loss is measured using the Baroid HT/HP filter press.

All tests were carried out on a cement slurry of density 1.87 kg/l. It contained 44 l of water per 100 kg of deep-drilling cement.

Comparison substances

EXAMPLE I

Carboxymethylhydroxyethylcellulose, DS=about 0.65, MS about 0.8

Apparent viscosity of a 1% solution in distilled water: about 14 mPas measured with Fann 35SA at 600 rpm.

EXAMPLE II

Hydroxyethylcellulose, MS=about 2.4

Apparent viscosity of a 1% solution in distilled water: about 10 mPas measured with Fann 35SA at 600 rpm.

EXAMPLE III

Mixed polymer comprising

65% of 2-acrylamido-2-methylpropanesulfonic acid (AMPS)

15% of acrylamide (AM)

20% of N-vinyl-N-methylacetamide (ViMA)

K value=190, according to Fikentscher.

Copolymers according to the invention prepared according to Example 1:

EXAMPLE IV

65% of AMPS

20% of ViMA

15% of diallyldimethylammonium chloride (DADMAC)

K value=162

TABLE 1

| Preparation Example | Synthesis according to Preparation Example | K value | \multicolumn{5}{l}{Monomer composition in % by weight} |
|---|---|---|---|---|---|---|---|
| | | | AMPS | ViMA | VINPYR | DADMAC | Other |
| 6 | 1 | 158 | 60 | 25 | | 15 | |
| 7 | 2 | 183 | 75 | | | 25 | |
| 8 | 2 | 169 | 65 | 5 | | 30 | |
| 9 | 1 | 186 | 55 | 20 | | 15 | 10 dodecyl acrylate |
| 10 | 2 | 160 | 55 | 20 | | 10 | 15 dodecyl acrylate |
| 11 | 1 | 181 | 75 | | 10 | 15 | |
| 12 | 1 | 148 | 80 | | 5 | 15 | |
| 13 | 1 | 152 | 15 | 25 | | 60 | |
| 14 | 2 | 154 | 5 | | 95 | | |
| 15 | 2 | 167 | 40 | 10 | 10 | 20 | 15 vinylsulfonic acid 5 acrylic acid |

The use of the copolymers is illustrated in more detail by the examples which follow

EXAMPLE V

60% of AMPS
25% of ViMA
15% of DADMAC
K value=158

Copolymers according to the invention prepared according to Example 2:

EXAMPLE VI

75% of AMPS
25% of DADMAC
K value=183

EXAMPLE VII

65% of AMPS
5% of ViMA
30% of DADMAC
K value=169

TABLE II

| Example | g of product per 100 g of cement | g of dispersant | Apparent viscosity according to Fann at 600 rpm in mPas | Water loss in cm³ API spec. 10, 325 mesh 1000 psi |
|---|---|---|---|---|
| I   | a) 0.5  | 0.5  | 62   | 81  |
|     | b) 0.75 | 0.75 | 112  | 64  |
| II  | a) 0.5  | 0.5  | 64   | 106 |
|     | b) 0.75 | 0.75 | 118  | 78  |
|     | 0.5     | 0.5  | 107  | 70  |
|     | 0.75    | 1.0  | >150 | 58  |
| IV  | a) 0.5  | 0.5  | 78   | 60  |
|     | b) 0.75 | 1.0  | 86   | 44  |
| V   | 0.5     | 0.5  | 59   | 58  |
|     | 0.75    | 1.0  | 78   | 45  |
| VI  | 0.5     | 0.5  | 68   | 56  |
| VII | 0.5     | 0.5  | 76   | 62  |

The examples show the superiority of the copolymers according to the invention.

With respect to cellulose polymers such as CMHEC and HEC (Example I and II) they reduce water loss more efficiently. If a larger amount of cellulose polymers is used, water loss is reduced further but viscosity is increased drastically.

Compared with the copolymers of EP 0,116,671 (Example III), the use of the products according to the invention makes it possible to formulate cement slurries having a low water loss and a substantially reduced viscosity.

Cement slurries of low viscosity and low water loss ensure good cementation. The low viscosity enables high turbulences, which are required in particular in inclined segments of the borehole for complete displacement of the mud.

2. Drilling mud and gypsum slurry, salt solution

The test was carried out using a filter press according to API Code 29. In this case, the amount filtered was measured through a filter area of $45.8 \pm 0.7$ cm² at a differential pressure of $7 \pm 0.7$ bar over a period of 30 minutes.

a. Drilling mud

A 4% by weight bentonite suspension contains 10 g/liter of the copolymer according to Preparation Example 6.

The amount filtered is first measured at 20° C., after aging for 15 hours at 150° and 200° C., and again at 20° C.

b. Gypsum slurry

A suspension of 350 g of $CaSO_4$ in 150 g of water is stirred with 15 g/liter of the copolymer according to Preparation Example 6 until the mixture is homogeneous and measured at 20° C.

c. Salt solution

A salt solution having a density of 1.8 g/cm³ and based on $CaBr_2$ (19.2% by weight) and $CaCl_2$ (15.2% by weight) contains 50 g/l of the copolymer according to Preparation Example 7 and is measured at 20° C., after an aging time of 15 hours at 100° and 150° C. and again at 20° C.

Results a. Drilling mud

|  | without aging | after 15 h at 150° C. | after 15 h at 200° C. |
|---|---|---|---|
| Water loss (cm³) | 8.5 | 9.2 | 10.0 | b. Gypsum slurry
water loss: 7.2 cm³ c. Salt solution

|  | without aging | after 15 h at 100° C. | after 15 h at 150° C. |
|---|---|---|---|
| Water loss (cm³) | 23.0 | 10.5 | 11.0 |

The results show that the compounds according to the invention stabilize the water loss of drilling muds up to more than 200° C. They also substantially reduce the water release of non-colloidal suspensions of solids, as demonstrated by the result using the gypsum slurry. Even in the case of salt solutions having high salinities and temperatures of 150° C., the compounds according to the invention reduce the water loss very efficiently. Under these conditions, hydroxyethylcelluloses are not suitable.

We claim:

1. A water-soluble copolymer, which comprises 5 to 90% by weight of groups of the formula

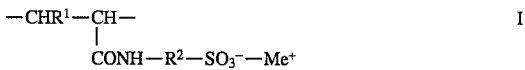

in which $R^1$ is hydrogen or methyl, $R^2$ is $C_2$–$C_{10}$-alkylene and Me is ammonium or an alkali metal, 5 to 90% by weight of groups of the formula

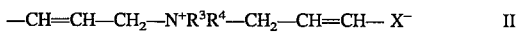

in which X is a halogen, $R^3$ and $R^4$, independently of one another, are $C_1$–$C_6$-alkyl, formula III must be present in an amount up 60% by weight of groups of the formula

in which $R^5$ and $R^6$, independently of one another, are hydrogen, methyl or ethyl or $R^5$ and $R^6$ together are a propylene group which with inclusion of the radical

forms a pyrrolidone radical, and 0–30% by weight of groups of the formula

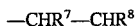 IV in which $R^7$ is hydrogen or methyl and $R^8$ is $CONH_2$, $CON(CH_3)_2$, cyano, $SO_3H$, $SO_3Me$, $C_6H_4SO_3H$, $C_6H_4SO_3Me$, $CH_2SO_3H$, $CH_2SO_3Me$, COOH, COOMe, or carboxy-$C_1$–$C_{15}$-alkyl, and Me is an ammonium cation or an alkali metal cation, and the order of components I to IV can be in any sequence.

2. A solid suspension, comprising a copolymer as claimed in claim 1.

3. A solid suspension as claimed in claim 2, comprising 0.1–4% by weight of the copolymer.

4. A solid suspension as claimed in claim 2, comprising 2–75% by weight of solid.

5. A water-binding additive for suspensions of solids comprising a copolymer as claimed in claim 1.

6. A water-binding additive for aqueous salt solutions comprising a copolymer as claimed in claim 1.

7. A water-soluble copolymer as claimed in claim 1, wherein $R^2$ is $C_2$–$C_6$-alkylene.

8. A water-soluble copolymer as claimed in claim 1, wherein $R^2$ is $C_4$-alkylene.

9. A water-soluble copolymer as claimed in claim 1, wherein X is chloride.

10. A water-soluble copolymer as claimed in claim 1, wherein $R^3$ and $R^4$, independently of one another, are $C_1$–$C_3$-alkyl.

11. A water-soluble copolymer as claimed in claim 1, wherein $R^3$ and $R^4$, independently of one another, are methyl or ethyl.

12. A water-soluble copolymer as claimed in claim 1, wherein $R^8$ is carboxy-$C_1$–$C_8$-alkyl.

13. A solid suspension as claimed in claim 2, wherein said copolymer comprises 40–80% by weight of groups of the formula I, 10–50% by weight of groups of the formula II and 5–30% by weight of groups of the formula III.

14. The solid suspension as claimed in claim 3, wherein the solid is from 2–75% by weight.

15. The water soluble copolymer as claimed in claim 7, wherein X is chloride and $R^3$ and $R^4$ independently of one another are a $C_1$–$C_3$ alkyl.

16. The water soluble copolymer as claimed in claim 8, wherein X is chloride and $R^3$ and $R^4$ independently of one another are methyl or ethyl.

17. The solid suspension as claimed in claim 14 wherein said copolymers comprises 40–80% by weight of the groups of formula I, 10–50% by weight of the groups of formula II, and 5–30% by weight of the groups of formula III.

18. The water soluble copolymer as claimed in claim 1, wherein the copolymer comprises 40–80% by weight of the groups of formula I, 10–50% by weight of the groups of formula II, and 5–30% by weight of the groups of formula III.

19. The water soluble copolymer as claimed in claim 1, wherein the copolymer comprises 40–90% by weight of the groups of formula I and 10–60% by weight of the groups of formula II.

20. The copolymers as claimed in claim 1, wherein the monomers are selected from the group consisting of 2-acrylamido-2-methylpropanesulfonates, diallyldimethylammonium chloride, N-vinyl-N-methylacetamide, acrylamide, acrylates and mixtures thereof.

21. The water-soluble copolymer as claimed in claim 1, wherein formula III is present in an amount from 5 to 60% by weight.

22. The water-soluble copolymer as claimed in claim 21, wherein formula III is present in an amount from to 5 to 30% by weight.

* * * * *